United States Patent
Chacko et al.

(10) Patent No.: US 7,348,194 B2
(45) Date of Patent: Mar. 25, 2008

(54) ELECTRODE COMPOSITIONS CONTAINING CARBON NANOTUBES FOR SOLID ELECTROLYTE CAPACITORS

(75) Inventors: Antony P. Chacko, Greer, SC (US); Qingping Chen, Simpsonville, SC (US); Randy S. Hahn, Simpsonville, SC (US); John T. Kinard, Greer, SC (US); Philip M. Lessner, Simpsonville, SC (US); Brian J. Melody, deceased, late of Greer, SC (US); by Anita Melody, legal representative, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 11/803,213

(22) Filed: May 14, 2007

(65) Prior Publication Data
US 2007/0242412 A1    Oct. 18, 2007

Related U.S. Application Data

(62) Division of application No. 11/336,483, filed on Jan. 20, 2006.

(51) Int. Cl.
*H01G 9/00* (2006.01)

(52) U.S. Cl. .............. 438/25.03; 438/25.03; 361/509; 361/517; 361/519; 361/525; 361/528; 361/532; 257/E21.008

(58) Field of Classification Search .......... 361/509, 361/517, 519
See application file for complete search history.

(56) References Cited

U.S. PATENT DOCUMENTS

| | | | | |
|---|---|---|---|---|
| 5,005,107 | A | * | 4/1991 | Kobashi et al. ............ 361/540 |
| 6,086,642 | A | * | 7/2000 | Fukaumi et al. .......... 29/25.03 |
| 6,154,358 | A | * | 11/2000 | Fukaumi et al. ............ 361/523 |
| 6,219,223 | B1 | * | 4/2001 | Kobayashi et al. ......... 361/525 |
| 6,304,427 | B1 | | 10/2001 | Reed et al. ................. 361/523 |
| 6,343,005 | B1 | | 1/2002 | Tadanobu et al. .......... 361/532 |
| 6,665,169 | B2 | | 12/2003 | Tennent et al. ............. 361/303 |
| 6,762,237 | B2 | | 7/2004 | Glatkowski et al. ........ 524/496 |
| 6,781,817 | B2 | | 8/2004 | Andelman ................... 361/503 |
| 6,816,357 | B2 | | 11/2004 | Takatani et al. ............ 361/523 |
| 6,858,891 | B2 | | 2/2005 | Farnworth et al. .......... 257/296 |
| 6,911,373 | B2 | | 6/2005 | Kellar et al. ................ 438/399 |
| 6,919,119 | B2 | | 7/2005 | Kalkan et al. .............. 428/119 |
| 6,934,144 | B2 | | 8/2005 | Ooma et al. ................ 361/303 |
| 6,936,233 | B2 | | 8/2005 | Smalley et al. .......... 423/447.1 |
| 2002/0048143 | A1 | | 4/2002 | Lee et al. .................... 361/502 |

* cited by examiner

*Primary Examiner*—Michael S. Lebentritt
*Assistant Examiner*—Kyoung Lee
(74) *Attorney, Agent, or Firm*—Joesph T. Guy; Nexsen Pruet, LLC

(57) ABSTRACT

An improved capacitor with an anode with an anode wire and an oxide layer on the surface of the anode. A cathode layer is exterior to the oxide layer. A carbon conductive layer is exterior to the cathode layer wherein the cathode layer comprises 5-75 wt % resin and 25-95 wt % conductor. The conductor has carbon nanotubes. An anode lead is in electrical contact with the anode wire and a cathode lead is in electrical contact with the carbon conductive layer.

20 Claims, 1 Drawing Sheet

ELECTRODE COMPOSITIONS CONTAINING CARBON NANOTUBES FOR SOLID ELECTROLYTE CAPACITORS

CROSS-REFERENCE TO RELATED APPLICATIONS

This application is a divisional application of U.S. patent application Ser. No. 11/336,483 filed Jan. 20, 2006 which is pending.

BACKGROUND

The present invention is related to an improved method of forming a solid electrolyte capacitor and an improved capacitor formed thereby. More specifically, the present invention is related to conductive layers comprising carbon nanotubes and an improved capacitor comprising the improved conductive structure.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as 7,7',8,8'-tetracyanoquinonedimethane (TCNQ) complex salt, or intrinsically conductive polymers, such as polyaniline, polypyrol, polyethylenedioxythiophene and their derivatives. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically consists of several layers which are external to the anode body. In the case of surface mount constructions these layers typically include: a carbon layer; a layer containing a highly conductive metal, typically silver, bound in a polymer or resin matrix; a conductive adhesive layer such silver filled adhesive; and a highly conductive metal lead frame. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or spray techniques with other less desirable techniques being reported.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with silver layer, buildup, and mechanical properties. There has been a constant conflict in the art to optimize these various characteristics. For example, a higher concentration of resin is preferred for adhesion. As the resin concentration increases the adhesion of the carbon layer improves. Conductivity on the other hand occurs through the carbon particles and therefore it is preferred to minimize the resin to insure adequate conductivity. Those of skill in the art have heretofore been forced to optimize the conflicting parameters of adhesion with conductivity. It has long been considered important to avoid decreasing the carbon content due to the loss of conductivity.

U.S. Pat. No. 6,556,427 attempts to circumvent the conflict between adhesion and conductivity of the carbon layer by allowing the binder of the carbon paste to infiltrate into the solid electrolyte layer. Controlling the degree of infiltration is difficult and variability in the infiltration will alter the composition of the carbon layer thereby resulting in variability in conduction and in adhesion with a subsequent layer.

The resistance across the carbon layer increases as the carbon buildup increases since the electrical path length across the layer is increased. However, thin layers provide less thermo-mechanical protection to the dielectric. Therefore, the carbon layer has long been considered necessary and yet a limiting factor in the further advancement of solid electrolytic capacitors.

The silver layer serves to conduct current from the lead frame to the cathode and around the cathode to the sides not directly connected to the lead frame. The critical characteristics of this layer are high conductivity, adhesive strength to the carbon layer, wetting of the carbon layer, and the mechanical properties. Compatibility with the subsequent layers employed in the assembly and encapsulation of the capacitor are also critical. In the case where a silver adhesive is used to attach to a lead frame compatibility with the silver adhesive is an issue. In capacitors which utilize solder to connect to the external lead solderability and thermal stability are important factors. In order for the solder to wet the silver layer, the resin in the silver must degrade below the temperature at which the solder is applied. However, excessive degradation of the resin creates an effect termed "silver leeching" resulting in a poor connection between the external cathode layers and the external cathode lead. The traditional approach to applying a silver layer requires a delicate compromise in thermal stability of the resin in order to simultaneously achieve solder wetting and to avoid silver leeching.

Through diligent research the present inventors have developed a carbon layer which circumvents the problems encountered in the prior art.

SUMMARY

It is an object of the present invention to provide an improved capacitor with lower equivalent series resistance (ESR).

It is another object of the present invention to provide a capacitor with improved conduction between conductive layers without detriment to the adhesion between these layers.

A particular feature of the present invention is the ability to provide the improvements with minor changes in the manufacturing and with improved yields due to the decrease in the amount of unusable material which typically results from either poor adhesion or poor conductivity between layers. The increased mechanical strength of the carbon coating of this invention provides better tolerance to thermal mechanical stress which the capacitors are exposed to during the manufacturing process. This also provides improved yield.

These, and other advantages, are provided in an improved capacitor. The capacitor has an anode with an anode wire and an oxide layer on the surface of the anode. A cathode layer is exterior to the oxide layer. A carbon conductive layer is exterior to the cathode layer wherein the cathode layer comprises 5-75 wt % resin and 25-95 wt % conductor. The conductor has carbon nanotubes. An anode lead is in electrical contact with the anode wire and a cathode lead is in electrical contact with the carbon conductive layer.

Yet another embodiment is provided in a method for forming a capacitor with the steps of:

forming an anode from a valve metal with an anode wire extending therefrom;

exposing a surface of the anode to an electrolyte solution to form an oxide layer through anodization thereon;

forming a cathode layer on at least a portion of the oxide layer;

applying a carbon coating layer on at least a portion of the cathode layer wherein the carbon coating layer comprises solvent, resin and carbon nanotubes;

removing the solvent from said carbon coating layer to form a carbon conductive layer;

attaching an anode lead into electrical contact with the anode wire; and attaching a cathode lead into electrical contact with the cathode layer.

DETAILED DESCRIPTION

The present invention mitigates the deficiencies of the prior art by providing improved conduction at a given layer thickness thereby allowing for lower ESR. This was previously considered contradictory in a single layer. The present invention will be described with reference to the various figures which illustrate, without limiting, the invention.

Figure 1:
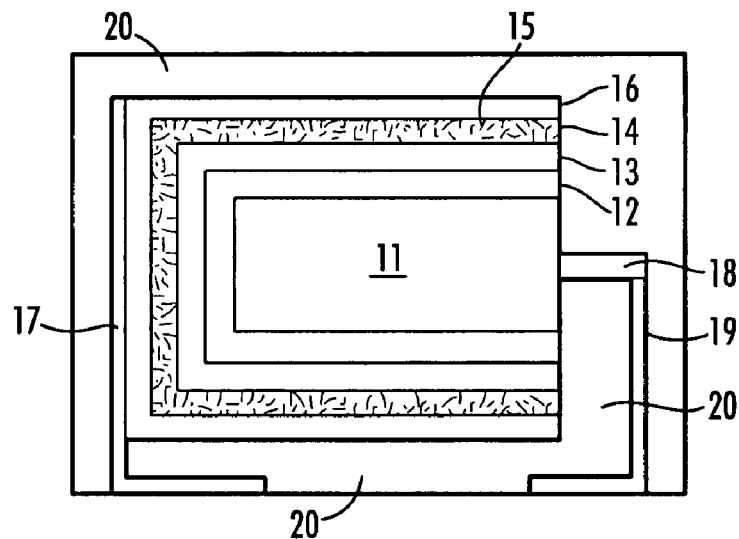
FIG. 1 is a schematic representation of a capacitor of the present invention.

In FIG. 1, a cross-sectional view of a capacitor is shown as represented at 10. The capacitor comprises an anode, 11, comprising a valve metal as described herein. A dielectric layer, 12, is provided on the surface of the anode, 11. The dielectric layer is preferably formed as an oxide of the valve metal as further described herein. Coated on the surface of the dielectric layer, 12, is a conductive layer, 13. The conductive layer preferably comprises conductive polymer, such as polyethylenedioxythiophene (PEDT), polyaniline or polypyrrole or their derivatives; manganese dioxide, lead oxide or combinations thereof. A carbon layer, 14, comprising carbon nanotubes, 15, is provided as a chemical barrier between the conductive layer and subsequent layers. A silver layer, 16, forms a direct electrical contact with the cathode terminal, 17, such that current flows from the cathode terminal through the successive layers sequentially. The carbon layer together with the silver layer provides a strongly adhered conductive path between the conductive layer, 13, and the cathode terminal, 17. An anode wire, 18, provides electrical contact between the anode, 11, and an anode terminal, 19. The entire element, except for the terminus of the terminals, is then preferably encased in a non-conducting material, 20, such as an epoxy resin.

The carbon layer comprises a conductive composition comprising resin; conductive particles and carbon nanotubes. The carbon layer may also comprise adjuvants such as crosslinking additives, surfactants and dispersing agents. The resin, conductive carbon particles, carbon nanotubes and adjuvants are preferably dispersed in an organic solvent or water to form a coating solution.

It is most preferable that the dried conductive composition comprises about 5-75 wt % polymer resin and about 25-95 wt % conductor. More preferably, the conductive composition comprises about 5-25 wt % polymer resin and most preferably the conductive composition comprises about 15-20 wt % polymer resin. The conductor comprises carbon nanotubes. In a particularly preferred embodiment the conductor comprises about 7-99.975 wt % conductive particles and 0.025-93 wt % carbon nanotubes. More preferably the conductor comprises 15-99 wt % conductive carbon particles and even more preferably 20-99 wt % conductive carbon particles. Most preferably the conductor comprises 70-93 wt % conductive carbon particles and most preferably 1-30 wt % carbon nanotubes.

For the purposes of the present invention conductive particles refer to discrete particles of conductive materials, excluding nanotubes, which are selected from the group consisting of carbon black, graphite and carbon fibers. Carbon black is the most preferred as commercially available from various commercial sources such as Degussa, Cabot or Columbian Chemicals. The conductive particles have a preferred particle size range of 5 nm-30 microns. More preferably the conductive carbon black particles have a preferred particle size range of 10-200 nm.

While not restricted to any theory it is hypothesized that the use of particles with a high aspect ratio, defined as the ratio of length of the material to the cross-sectional diameter, allows the resistance of the layer to be decreased without the high amounts of conductive filler normally required. The conductive particles with high aspect ratio lower the percolation threshold thereby allowing for more binder to be used, which is preferable for adhesion.

The resin for the conductive layer is a polymer capable of forming secondary bonding with conductive particles and nanotubes. Preferred resins are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The carbon layer is preferably dispersed in an organic solvent. Preferably the organic solvent is present in an amount of 20-90 wt %. More particularly the organic solvent is present in an amount of 40-60 wt %. The organic solvent is preferable selected from glycol ethers, glycol ether ester, N-methyl pyrrolidone, dimethyl formamide, xylene, etc. A particularly preferred solvent is glycol ether ester due to the good polymer solubility and high boiling point.

The carbon nanotubes are strand like fibers of graphene (a single planar sheet of $sp^2$ bonded carbon atoms) related structures with a cross-sectional diameter in the nanometer range and a very high aspect ratio. Single-walled carbon nanotubes (SWNT) have a diameter in the range of 1-200 nm. More preferably, the single walled carbon nanotubes have a diameter in the range of 1-50 nm and even more preferably 1-20 nm. A diameter of 1-2 nm is most preferable for demonstration of the technology however the cost is currently prohibitive for large scale use. The length of the SWNT nanotubes is at least about 200 nm. Multi-walled nanotubes are less preferred than single-walled nanotubes however they are readily available commercially. Vapor grown carbon fiber (VGCF) is a form of carbon tube with a diameter of 50-200 nm and a length of at least 5 μm and is a highly crystalline fine carbon fiber synthesized by the vapor-phase method.

The silver layer comprises silver and a resin. It is most preferable that the silver layer be at least 5 μm thick. The silver composition of the silver layer is preferably 40 wt % to no more than about 95 wt % (dry basis). Below 40 wt % the conductivity is inadequate and above 95 wt % the adhesion is unacceptable. It is more preferred that the silver content of the silver layer be at least 85 wt % to no more than 95 wt %.

Figure 2:
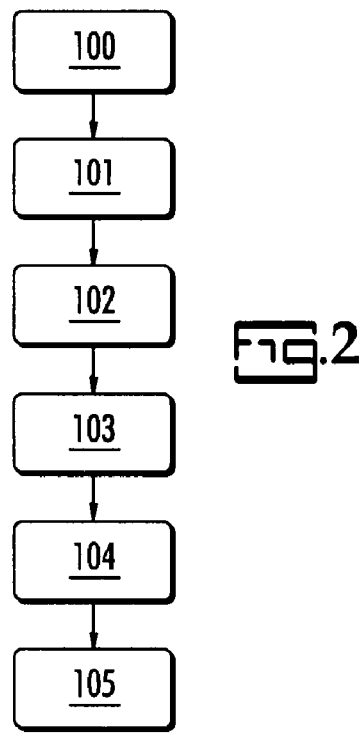
FIG. 2 is a flow chart representation of the process of the present invention.

The process for forming the capacitor is illustrated in FIG. 2.

Referring to FIG. 2, the anode is formed, 100, from a valve metal as described further herein.

The valve-metal is preferably selected from niobium, aluminum, tantalum, titanium, zirconium, hafnium, tungsten and alloys or combinations thereof. Aluminum, tantalum and niobium are most preferred. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The valve metal is preferably etched to increase the surface area particularly if the valve metal is a foil such as aluminum foil. Etching is preferably done by immersing the valve metal into at least one etching bath. Various etching baths are taught in the art and the method used for etching the valve metal is not limited herein.

A dielectric is formed, 101, on the surface of the valve metal. It is most desirable that the dielectric layer be an oxide of the valve metal. The oxide is preferably formed by dipping the valve metal into an electrolyte solution and applying a positive voltage to the valve metal. Electrolytes for the oxide formation can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the oxide on the valve metal including aqueous solutions of dicarboxylic acids, such as ammonium adipate are also known. Other materials may be incorporated into the oxide such as phosphates, citrates, etc. to impart thermal stability or chemical or hydration resistance to the oxide layer.

A conductive layer is formed, 102, on the surface of the oxide. The conductive layer acts as the cathode of the capacitor. The cathode can be an organic material such as 7,7',8,8'-tetracyanoquinodimethane complex. Particularly the cathode can be intrinsically conducting polymers. Mentioned as exemplary polymers are polymerized aniline, polymerized pyrrole, polymerized thiophenes, and derivatives thereof. The cathode layer can also comprise manganese dioxide. The manganese dioxide layer is preferably obtained by immersing an anode element in an aqueous manganese nitrate solution. The manganese oxide is then formed by thermally decomposing the nitrate at a temperature of from 200° to 350° C. in a dry or steam atmosphere. The anode may be treated multiple times to insure optimum coverage.

The conducting polymer is preferably chosen from polypyrroles, polyanilines, polythiophenes and polymers comprising repeating units of Formula I, particularly in combination with organic sulfonates:

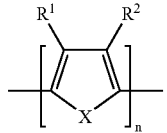

FORMULA 1 wherein $R^1$ and $R^2$ are chosen to prohibit polymerization at the beta-site of the ring and X is S, Se or N.

A particularly preferred polymer is 3,4-polyethylene dioxythiophene (PEDT).

The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

After conductive cathode layer formation, 102, a carbon layer comprising carbon nanotubes is applied, 103, by spraying or dipping.

A silver layer is applied, 104, onto the carbon layer preferably by spraying or dipping.

It is preferred that each layer be at least partially dried prior to coating of the subsequent layer thereon. Alternatively, the layers may be coated in a wet-on-wet fashion with adequate surface tension in each layer to prohibit substantial mixing of the layers. The layers can then be dried, or cured, simultaneously.

The capacitor is finished, 105, by incorporating anode and cathode terminals and external insulators as known in the art. In surface mount capacitors silver adhesive is typically used to 'glue' the silver layer to the lead frame which serves as the cathode lead. For leaded devices solder is often used to attach a cathode lead to the silver layer.

It is preferable to include adjuvants to the carbon coating solution to facilitate wetability and leveling properties of the coating solution. Particularly preferred wetting agents include fluorinated surfactants such as those supplied by DuPont de Nemours under the trade name Zonyl, which are preferably added in an amount of up to 1 wt % of the coating solution.

EXAMPLES

Example 1

Pellets with dimensions of 4.62×3.25×0.81 mm (0.182× 0.128×0.032 inches) were pressed from commercially available capacitor grade tantalum powder. The pellets were sintered to create tantalum anodes with 48,000 CV/g. The pellets were anodized in a phosphoric acid and water electrolyte to 21 volts at 60° C. The pellets were impregnated with poly (3,4-ethylenedioxythiophene) (commercially available as BAYTRON M from HC Starck) using an iron tosylate chemical oxidation process. In the control samples (C-1) the parts were dipped in a standard commercially available carbon suspension formulation. In the inventive samples (I-1) the parts were dipped in a carbon suspension comprising the same carbon suspension formulation with 2 wt % vapor grown carbon nanotubes included therein. Both control and inventive suspensions were adjusted to constant viscosity. The parts were subsequently dipped in silver paint, attached to leadframes and encapsulated in a transfer molding process. The ESR of the parts was determined after the transfer molding process. The parts were processed through in-line aging and burn-in and then passed through an IR reflow oven to simulate board mounting at 220° C. in a solder joint which is equivalent to about 245° C. in air. The ESR was measured again after the IR reflow step. The relative ESR data is summarized in Table 1.

TABLE 1

| Carbon | Relative ESR (mohms) after encapsulation | Relative ESR (mohms) after IR reflow |
|---|---|---|
| C-1 | 10.0 | 10.5 |
| I-1 | 9.7 | 10.0 |

The results presented in Table 1 clearly demonstrate a lower ESR for the samples comprising a partial replacement of the carbon black with carbon nanotubes. The improvement in ESR is highly desirable.

Example 2

A series of samples were prepared in a manner analogous to Example 1 except for the carbon layer. In the control samples (C-2) a mixture of 42 wt % graphite and 20 wt % carbon black was incorporated. In an inventive sample (I-2) a mixture of 20 wt % carbon black and 20 wt % carbon nanotubes was used both with a phenoxy resin. The average ESR was determined as in Example 1 with the relative results provided in Table 2.

TABLE 2

| Carbon | Relative ESR after encapsulation |
|---|---|
| C-2 | 10.0 |
| I-2 | 9.6 |

The results presented in Table 2 clearly demonstrate the advantages in ESR using carbon nanotubes.

Example 3

A series of capacitors were prepared as in Example 1 except for the carbon layer and manganese dioxide was used as the conductor layer instead of the conductive polymer. In a comparative example the carbon layer comprised 90 wt % graphite (C-3); in an inventive sample the carbon layer comprises 90 wt % carbon nanotubes (I-3). A silver layer was applied as known in the art. The ESR was determined prior to lead frame attachment for each sample and the relative mean is reported in Table 3.

TABLE 3

| Sample | ESR, mohms (before lead frame attachment) |
|---|---|
| C3 | 100.0 |
| I3 | 85.7 |

The results presented in Table 3 clearly demonstrate the improvements in ESR offered by the incorporation of carbon nanotubes.

The invention has been described with particular emphasis on the preferred embodiments. One of skill in the art would realize additional embodiments, alterations, and advances which, though not enumerated, are within the invention as set forth more specifically in the claims appended hereto.

The invention claimed is:

1. A method for forming a capacitor comprising:
   forming an anode from a valve metal with an anode wire extending therefrom;
   exposing a surface of said anode to an oxidizing solution to form an oxide layer thereon;
   forming a cathode layer on at least a portion of said oxide layer;
   applying a carbon coating layer on at least a portion of said cathode layer wherein said carbon coating layer comprises solvent, resin and carbon nanotubes;
   removing said solvent from said carbon coating layer to form a carbon conductive layer;
   attaching an anode lead into electrical contact with said anode wire; and
   attaching a cathode lead into electrical contact with said cathode layer.

2. The method for forming a capacitor of claim 1 further comprising applying a silver conductive layer between said applying a carbon coating layer and said attaching an anode lead.

3. The method for forming a capacitor of claim 1 wherein said carbon conductive layer comprises 5-75 wt % resin.

4. The method for forming a capacitor of claim 3 wherein said carbon conductive layer comprises 15-20 wt % resin.

5. The method for forming a capacitor of claim 1 wherein said resin comprises at least one material selected from phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles polybenzothiazoles, silicone polyester, silicone epoxy and silicone.

6. The method of forming a capacitor of claim 1 wherein said carbon conductive layer further comprises conductive carbon particles.

7. The method of forming a capacitor of claim 6 wherein said conductive carbon particles comprise carbon black.

8. The method of forming a capacitor of claim 1 wherein said carbon conductive layer comprises 0.025-93 wt % carbon nanotubes.

9. The method of forming a capacitor of claim 8 wherein said carbon conductive layer comprises 1-30 wt % carbon nanotubes.

10. The method of forming a capacitor of claim 1 wherein said carbon conductive layer comprises 7-99.975 wt % carbon.

11. The method of forming a capacitor of claim 1 wherein said carbon nanotubes comprise at least one selected from the group consisting of single wall carbon nanotubes, multiple wall carbon nanotubes and combinations thereof.

12. The method of forming a capacitor of claim 1 wherein said carbon nanotubes have a diameter of 1-200 nm.

13. The method of forming a capacitor of claim 12 wherein said carbon nanotubes have a diameter of 1-100 nm.

14. The method of forming a capacitor of claim 13 wherein said carbon nanotubes have a diameter of 1-2 nm.

15. The method of forming a capacitor of claim 1 wherein said carbon nanotubes have a length of at least 5 μm.

16. The method of forming a capacitor of claim 1 further comprising applying said carbon coating layer by dipping.

17. The method of forming a capacitor of claim 1 wherein said carbon coating solution comprises 20-90 wt % solvent.

18. The method of forming a capacitor of claim 1 wherein said solvent is selected from glycol ethers, glycol ester ethers, N-methyl pyrrolidone, dimethyl formamide and xylene.

19. The method of forming a capacitor of claim 18 wherein said solvent is selected from glycol ester ethers.

20. A capacitor formed by the method of claim 1.

* * * * *